3,264,677
SAFE EDGE METAL GROMMET

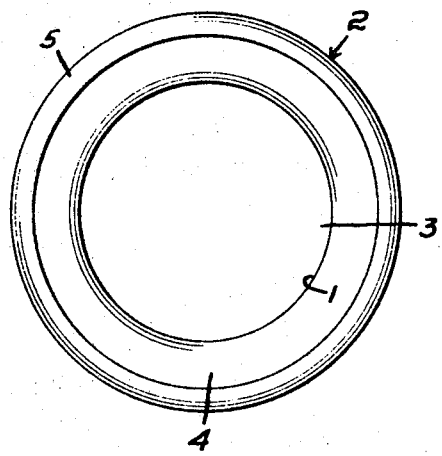
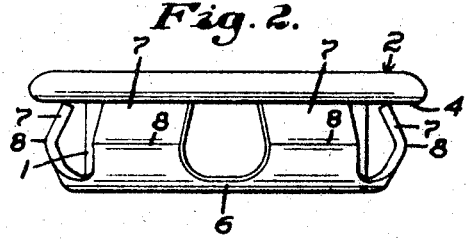
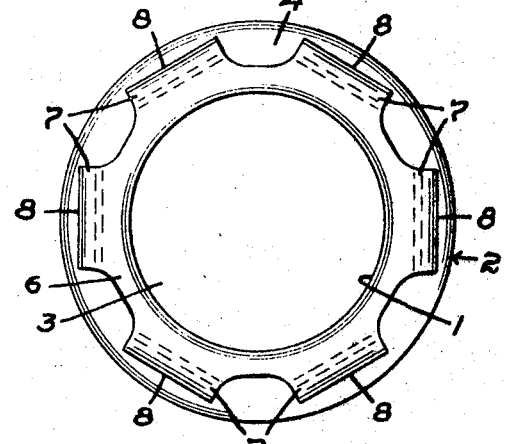
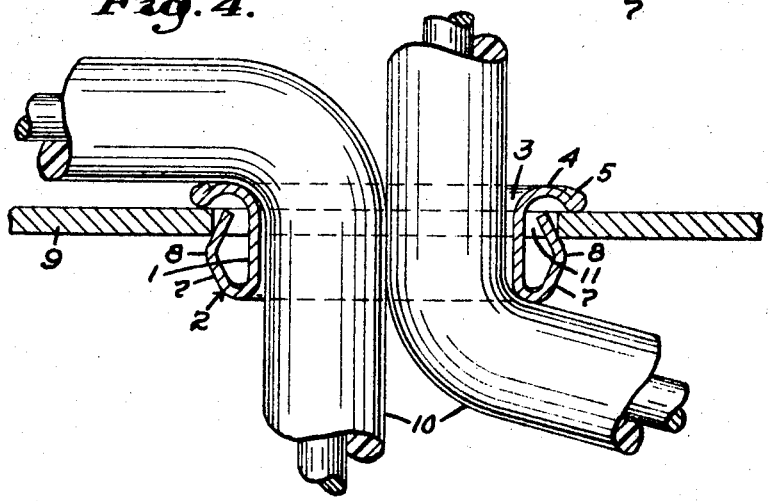

Conrad Olson, Arlington, Mass., assignor to United-Carr Incorporated, a corporation of Delaware
Original application Oct. 7, 1963, Ser. No. 314,460. Divided and this application Nov. 13, 1964, Ser. No. 411,063
4 Claims. (Cl. 16—2)

The invention relates generally to devices for protecting wiring, tubing, cabling and like articles, and is a division of co-pending application Serial No. 314,460, filed October 7, 1963.

More specifically the invention lies in a new and useful self-retaining metal grommet.

In the past, metal grommets have enjoyed considerable popularity in various industrial applications, particularly in the auto trade. Nevertheless due to a continuing conflict between two features which were almost universally sought but never satisfactorily provided in metal grommets, many manufacturers in recent years converted to the use of rubber or plastic grommets as the utilization of these materials became more extensive.

Specifically, the two features desired were: (1) totally smooth surfaces on the grommet in those areas with which an article passed through the grommet might come in contact and (2) some form of snap-in, self-retaining fastening means provided as a part of the grommet.

The procedure to date has generally been to provide the desired snap fastener retaining means as part of a one-piece device by cutting away portions of the device to form flexible fingers or tabs for engaging a support and therein lies the inherent difficulty in that cutting the metal most often results in sharp, burred edges which are capable of damaging the material of an article held in the grommet. Such a condition is of course particularly undesirable where an insulated conductor is to be passed through the device.

Patent No. 2,239,255 is illustrative of the type of device and method of forming same contemplated by the foregoing remarks.

The alternative of course is to attach a separate fastening means to the device but since this obviously results in an increase in cost, ergo an increase in price, many industries as previously indicated have preferred to use rubber or plastic grommets in lieu of the metal variety.

The fact that devices made of molded plastic or rubber would generally possess smooth, imperforate surfaces and the desired flexibility for snap fastening is rather obvious and requires no further explanation. However, such materials, as compared with metal, have other well-known characteristics which render them somewhat deficient for use in certain applications.

Primarily, of course they generally lack the strength of most metals. Admittedly this is not always true in some of the harder plastics but the harder plastics lack flexibility and are likely to crack if subjected to continuous shock and vibration, in particular when used on automotive vehicles.

On the other hand grommets made of rubber and the more resilient plastics have a tendency to fray and work loose when subjected to similar conditions.

Thus when viewed in the light of the prior art relating to one-piece grommets it is readily seen that the device of the present invention represents a significant advance in the art.

Specifically invention is seen to abide in the concept of cutting legs or fingers from a preformed flange, flaring the body portion of the grommet to form a second flange acting as a stop and thence bending the legs or fingers to form snap fastening means as a part of the grommet, thereby providing the desired combination of smooth, unburred surfaces adjacent the entrances to the grommet and integral snap fastening means.

Thus the specific objects of the invention are as follows:

(1) To provide a novel, inexpensive, one-piece, metal protection device;

(2) To provide a one-piece, metal protection device having totally smooth surfaces over all areas of the device with which an article to be protected by it might come in contact;

(3) To provide a one-piece, metal protection device having self-retaining fastening means formed as a part of the device and having totally smooth surfaces over all areas of the device with which an article being held by it might come in contact.

The invention will be more clearly understood from the following detailed description when read in conjunction with the accompanying drawings in which:

FIG. 1 is a top plan view of the device;

FIG. 2 is a side elevation of the device;

FIG. 3 is a bottom plan view of the device;

FIG. 4 is an installation in section depicting the device affixed to a support having cables passed therethrough.

The invention has been depicted in the form of a self-retaining grommet as a convenient form of disclosure.

As best shown in FIGS. 1 through 4 the tubular body portion 1 of the grommet 2 has a central aperture 3 throughout its length. The flange 4 is disposed at one end of the body portion 1 and optionally has a bead 5 formed on its periphery.

A smaller flange 6 is located at the opposite end of the body portion 1.

The fastener legs 7 are integral at one of their ends with the flange 6. The legs 7 are bent away from flange 6 in the direction of flange 4 and are spaced from the body portion 1 as best shown in FIGS. 2 and 4. FIG. 4 shows one end of the legs 7 as being adjacent flange 4 but not in contact with the flange. The legs 7 have been bent in diverging and thence converging directions with respect to the body portion 1 to form shoulders 8. The flange 4 as shown in FIG. 4 has been bent on itself towards flange 6 so as to partially enclose the ends of the legs 7 adjacent the flange 4.

An installation of the grommet 2 attached to an apertured support 9 having two cables 10 passed through the central aperture 3 is depicted in FIG. 4. In installation the grommet 2 is inserted in the aperture 11 in the support 9 with the end adjacent the flange 6 leading. The leading ends of the legs 7 yield until the shoulders 8 of the legs have cleared the opposite side of the support 9 and then spring back to their normal position with shoulders 8 gripping the underside of the support 9 and securing the grommet thereto. The diameter of the aperture 11 in the support 9 is something less than the distance between the shoulders 8 of any two opposite legs 7 and the flange 4 acts as a stop to prevent the grommet 2 from passing completely through the aperture 11 in the support.

Obviously the device may be made in a variety of lengths to accommodate supports of different thicknesses.

As further shown by FIG. 4 the wire 10 as it enters and leaves the grommet rides on the smooth internal edges of the flanges 4 and 6. Obviously since both flanges are to a degree bent back on themselves the cables 10 will always contact only smooth, unburred surfaces regardless of the direction from whence they come prior to entering the aperture 3 in the grommet 2.

With reference to the foregoing descriptions it is to be understood that what has been disclosed therein represents only a single embodiment of the invention, for example, it is contemplated that the tubular body portion of the grommet might be embossed or partially broken out to form the fastening means, and is to be construed as illustrative rather than restrictive or limiting in nature and that the scope of the invention is best described by the following claims.

What is claimed:

1. A one-piece sheet metal grommet comprising a hollow, continuous, generally circular, open end body portion, a first flange operable as a stop extending outwardly from one end of said body portion, a second flange extending outwardly from the opposite end of said body portion, each of said flanges presenting a continuous smooth surface adjacent said hollow body portion, and a plurality of snap acting legs integral with said second flange and disposed about the periphery of said body portion in spaced relation therewith, said legs extending toward said first flange and terminating in a free end in spaced relationship therewith and having a length at least as great as one half the length of said body portion.

2. A one-piece sheet metal grommet according to claim 1 wherein said first flange overlies the ends of said legs and its outer circumferential edge is bent downwardly toward said legs.

3. A one-piece sheet metal grommet according to claim 2 wherein portions of said first flange and the terminal free ends of said legs lie in a common, imaginary radial plane extending outwardly from said body portion.

4. A one-piece sheet metal grommet according to claim 1 wherein said first flange has a bead formed on the outer peripheral portion thereof.

References Cited by the Examiner
UNITED STATES PATENTS

| | | |
|---|---|---|
| 2,104,217 | 1/1938 | Barnes. |
| 2,239,255 | 4/1941 | Shaw _____ 16—2 X |
| 2,430,809 | 11/1947 | Flora et al. _____ 248—56 |
| 2,663,895 | 12/1953 | Petri _____ 16—2 |

EDWARD C. ALLEN, *Primary Examiner.*

D. L. TROUTMAN, *Assistant Examiner.*